United States Patent
Kim et al.

(10) Patent No.: US 11,512,419 B2
(45) Date of Patent: Nov. 29, 2022

(54) LAUNDRY MACHINE AND CONTROL METHOD THEREFOR

(71) Applicant: LG Electronics Inc., Seoul (KR)

(72) Inventors: Seongwoo Kim, Seoul (KR); Younghan Cho, Seoul (KR); Seokhee Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 925 days.

(21) Appl. No.: 16/073,444

(22) PCT Filed: Jan. 24, 2017

(86) PCT No.: PCT/KR2017/000822
§ 371 (c)(1),
(2) Date: Jul. 27, 2018

(87) PCT Pub. No.: WO2017/131412
PCT Pub. Date: Aug. 3, 2017

(65) Prior Publication Data
US 2021/0207304 A1    Jul. 8, 2021

(30) Foreign Application Priority Data
Jan. 28, 2016   (KR) ........................ 10-2016-0010693

(51) Int. Cl.
| D06F 33/34 | (2020.01) |
| D06F 39/00 | (2020.01) |
| D06F 105/48 | (2020.01) |
| D06F 101/10 | (2020.01) |
| D06F 103/04 | (2020.01) |

(Continued)

(52) U.S. Cl.
CPC .............. *D06F 33/34* (2020.02); *D06F 39/00* (2013.01); *D06F 34/28* (2020.02); *D06F 2101/04* (2020.02); *D06F 2101/10* (2020.02); *D06F 2103/04* (2020.02); *D06F 2103/06* (2020.02); *D06F 2103/46* (2020.02);
(Continued)

(58) Field of Classification Search
CPC .... D06F 34/18; D06F 2103/04; D06F 35/005; D06F 35/006; D06F 33/00–48
See application file for complete search history.

(56) References Cited

U.S. PATENT DOCUMENTS

| 2013/0283663 A1 | 10/2013 | Joplin | |
| 2013/0312202 A1* | 11/2013 | Balinski | .................. D06F 33/32 |
| | | | 8/137 |

(Continued)

FOREIGN PATENT DOCUMENTS

| KR | 10-0933976 | 12/2009 |
| KR | 20130020375 | 2/2013 |

(Continued)

*Primary Examiner* — Spencer E. Bell
(74) *Attorney, Agent, or Firm* — Fish & Richardson P.C.

(57) ABSTRACT

The present invention relates to a method for controlling a laundry machine, comprising a cloth sensing step of sensing the cloth of laundry, wherein the cloth sensing step comprises: a weight sensing step of sensing the weight of the laundry; a photographing step of photographing the inside of a drum; a volume sensing step of sensing the volume of the laundry inside the drum by mean of the captured image; and a density calculation step of calculating the density of the laundry on the basis of the sensed volume and weight.

18 Claims, 12 Drawing Sheets

(51) Int. Cl.
  *D06F 101/04*   (2020.01)
  *D06F 105/58*   (2020.01)
  *D06F 103/46*   (2020.01)
  *D06F 105/02*   (2020.01)
  *D06F 103/06*   (2020.01)
  *D06F 34/28*   (2020.01)

(52) U.S. Cl.
  CPC ...... *D06F 2105/02* (2020.02); *D06F 2105/48* (2020.02); *D06F 2105/58* (2020.02)

(56) References Cited

U.S. PATENT DOCUMENTS

2014/0076047 A1    3/2014   Liu
2014/0326067 A1    11/2014  Chanda et al.
2014/0352077 A1*   12/2014  Leitert ................... D06F 34/18
                                                    8/137
2016/0222577 A1*   8/2016   Ashrafzadeh ........... D06F 58/02

FOREIGN PATENT DOCUMENTS

KR    10-2013-0044764    5/2013
KR    10-2015-0105844    9/2015

* cited by examiner

[FIG 1]
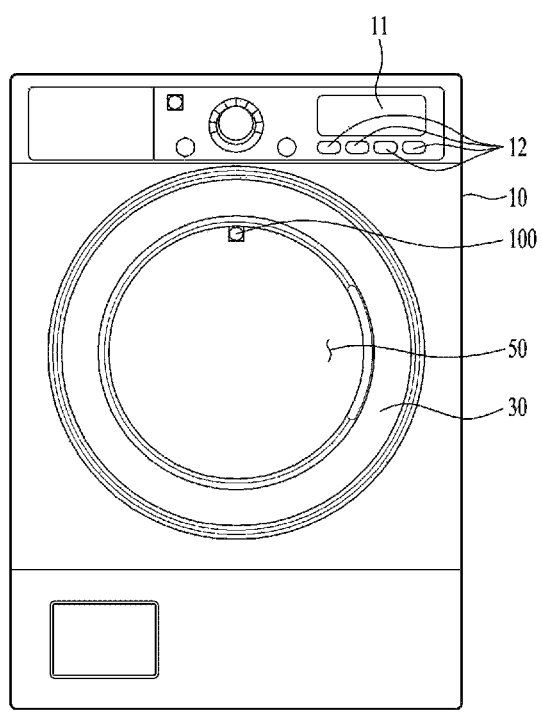

[FIG 2]
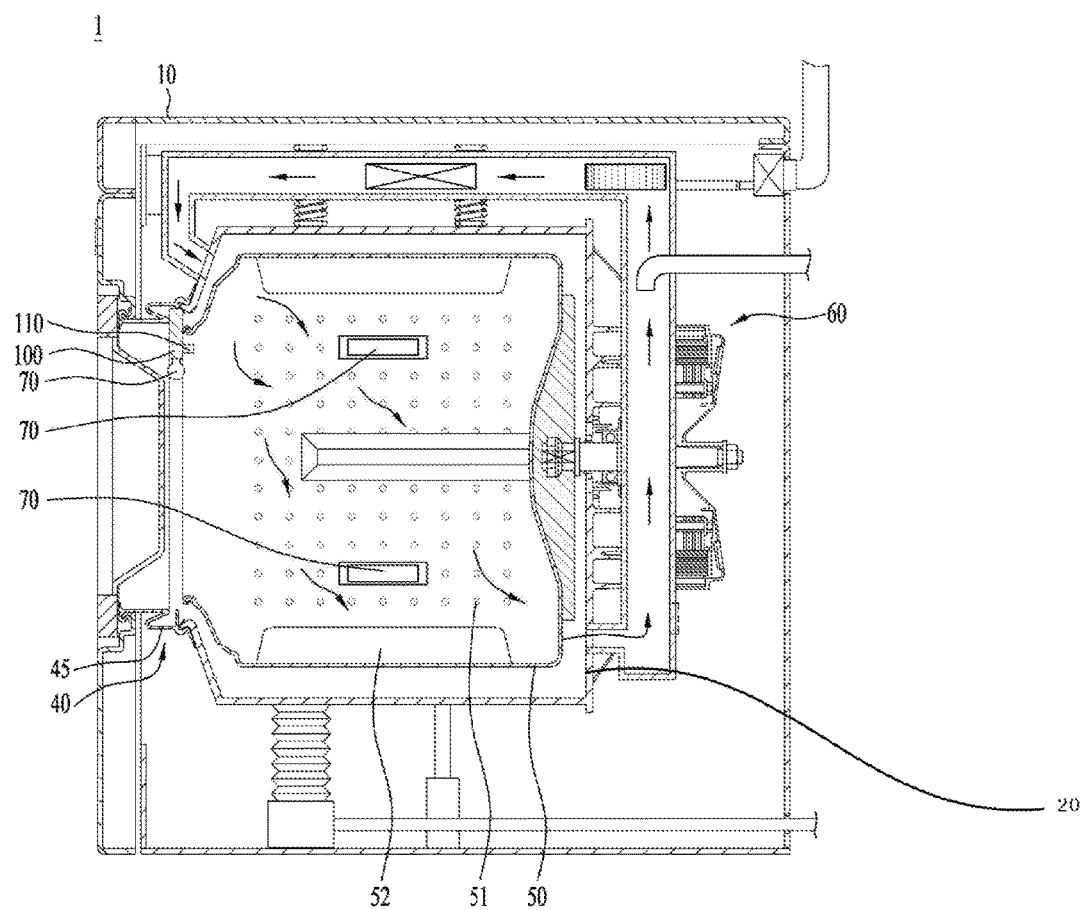

[FIG 3]
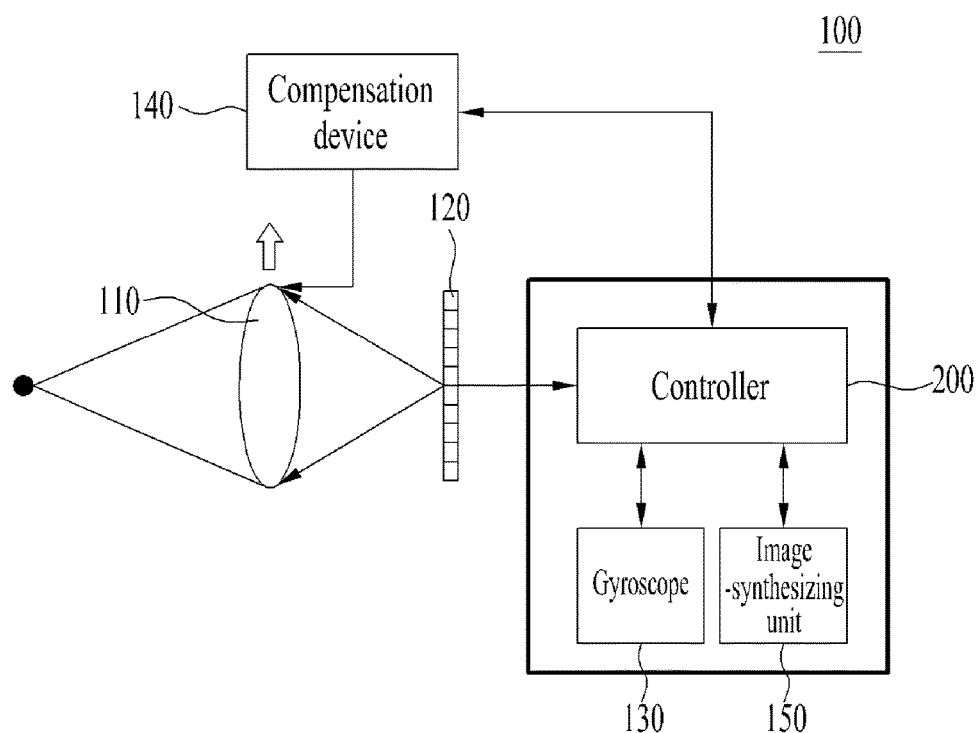

[FIG 4]
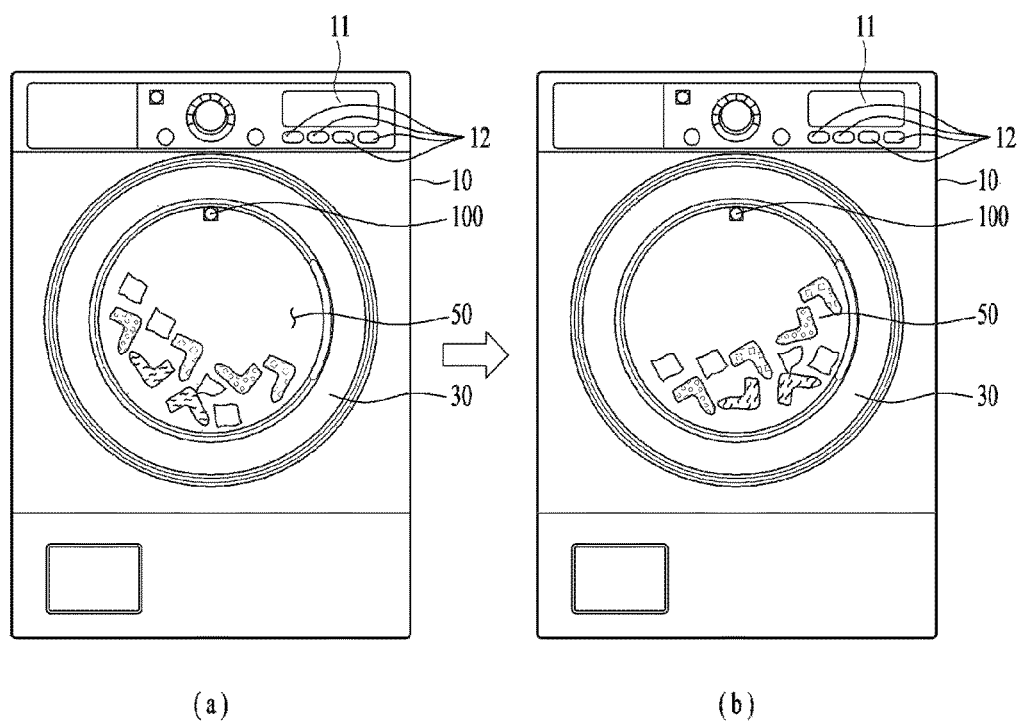
(a)　　　　　　　　(b)

[FIG 5]
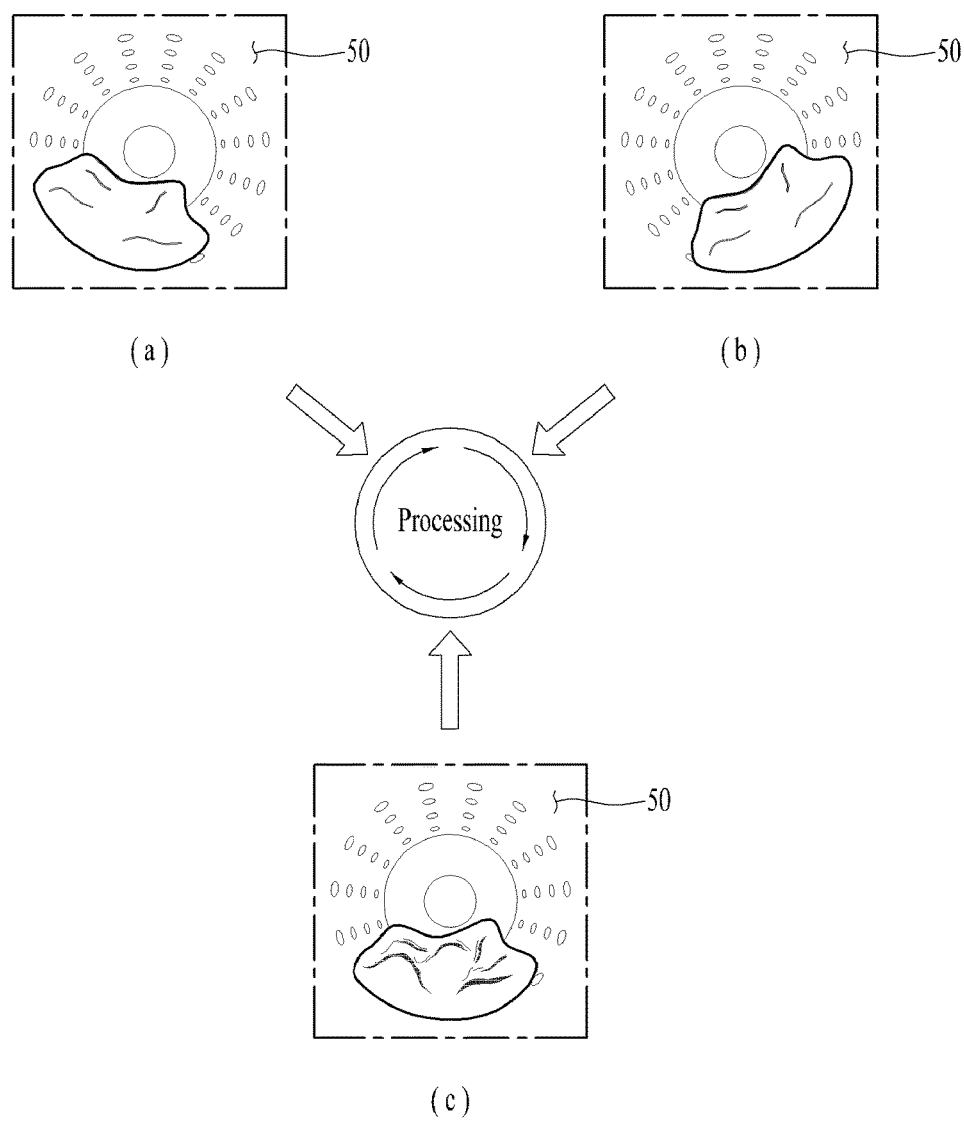

[FIG 6]
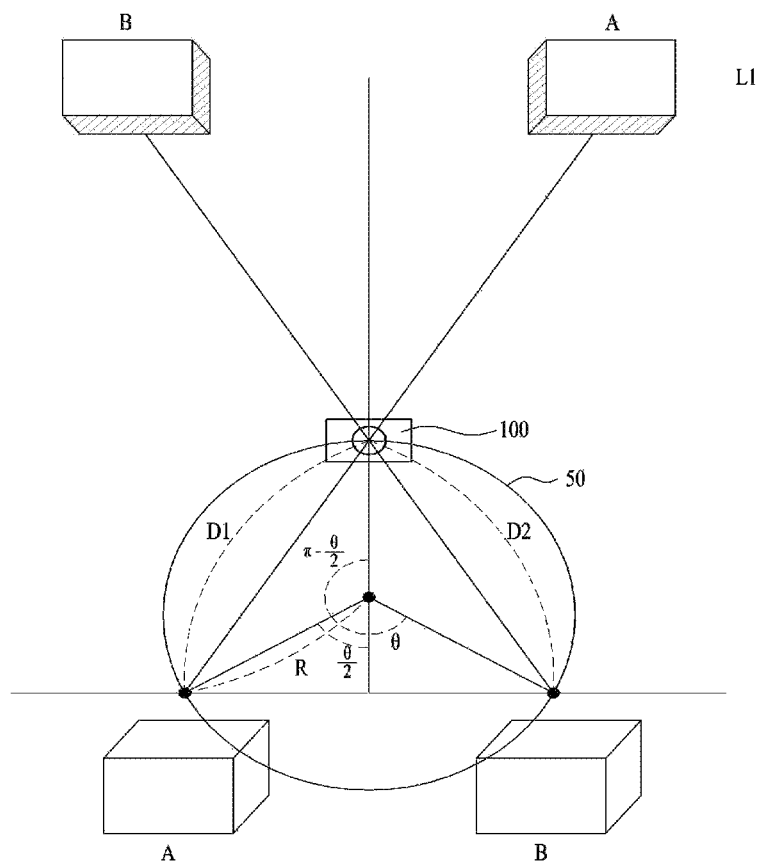

[FIG 7]
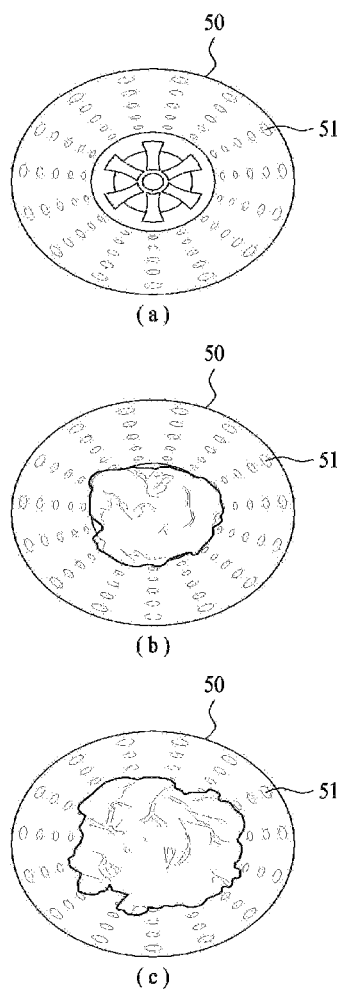

【FIG 8】
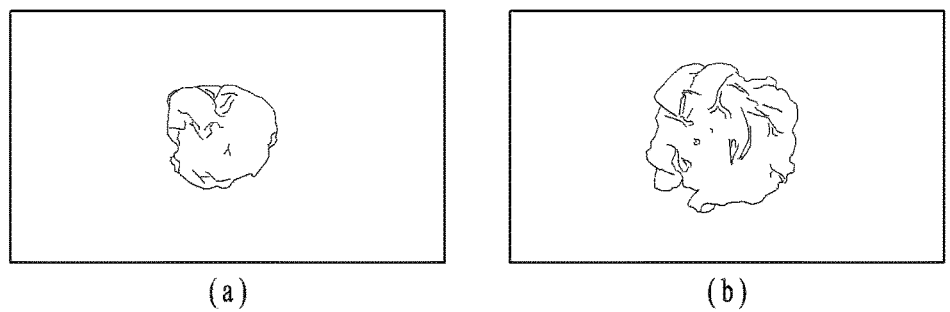
(a)　　　　　　　　　　　(b)
【FIG 9】
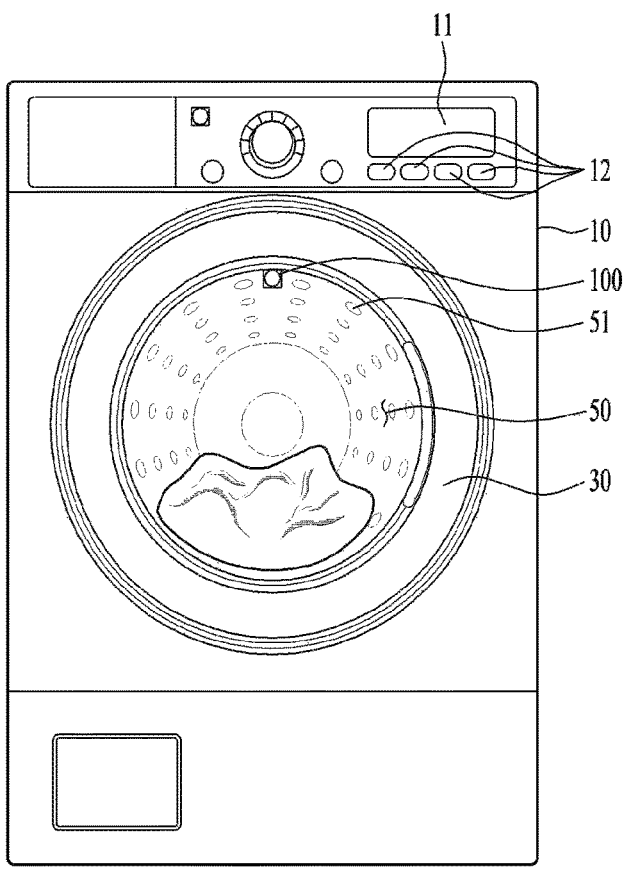

[FIG 10]
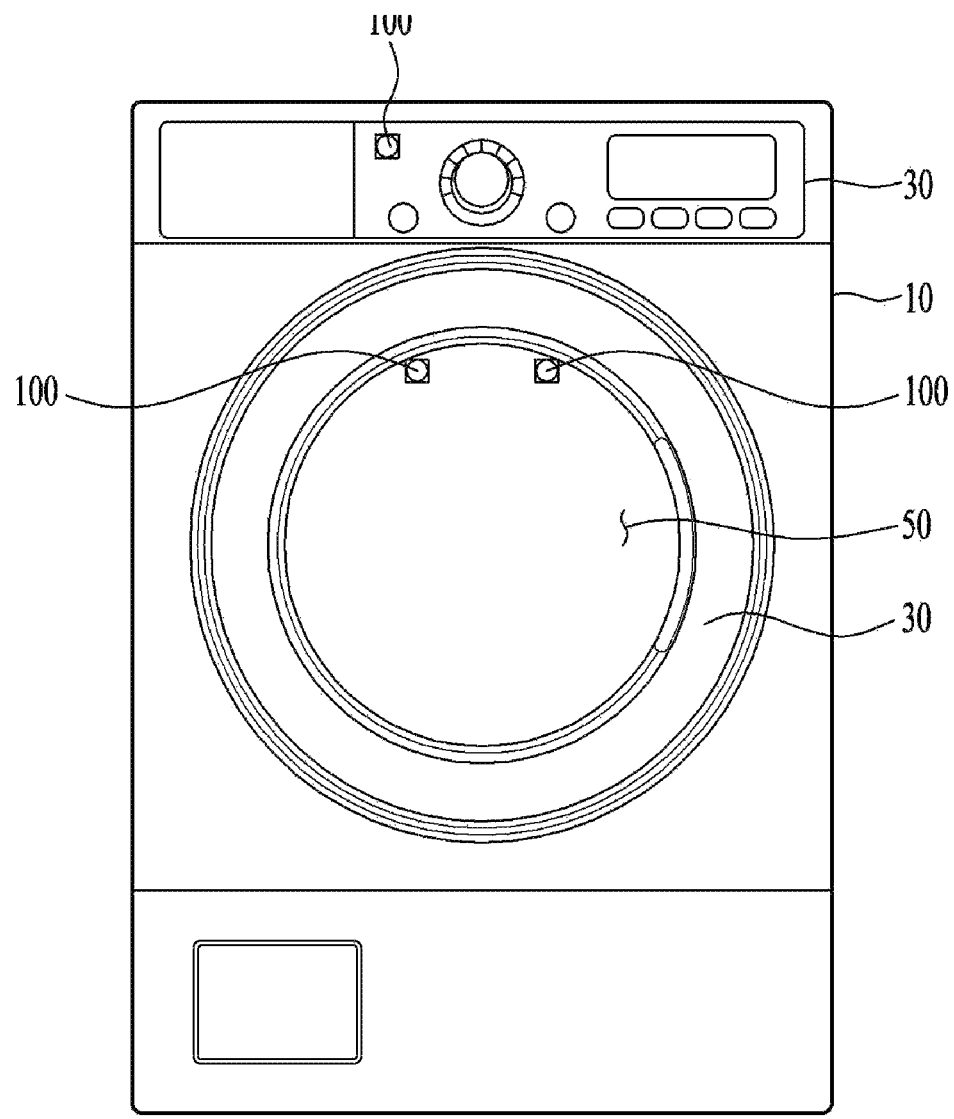

【FIG 11】
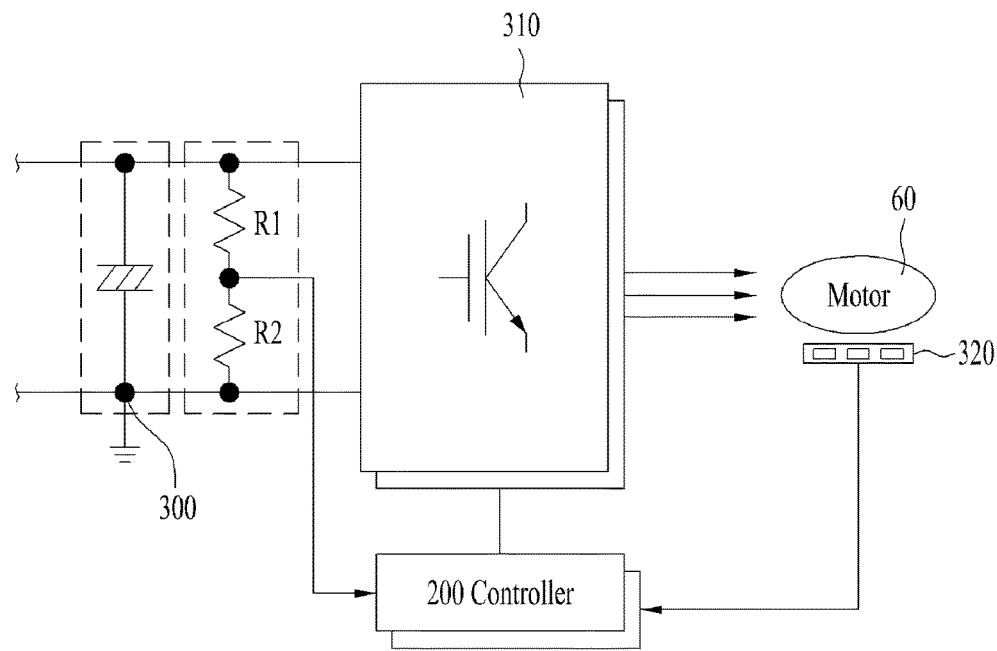

[FIG 12]
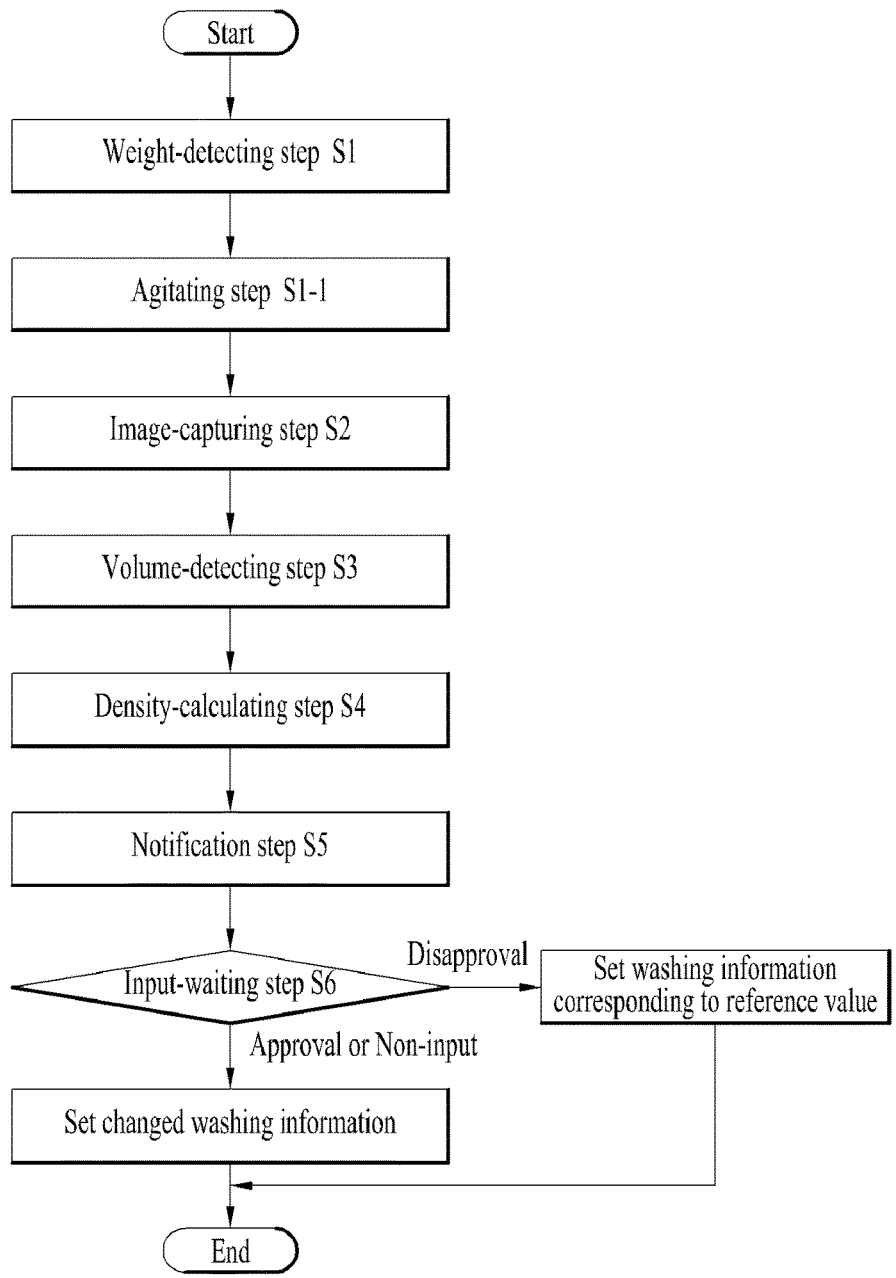

[FIG 13]
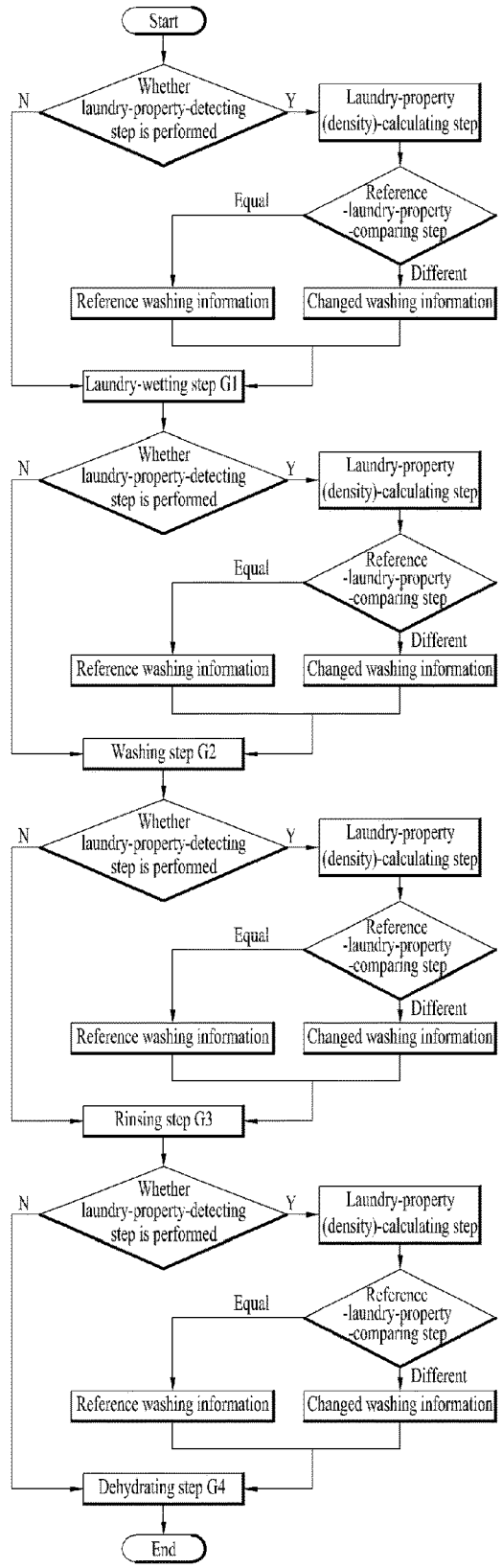

LAUNDRY MACHINE AND CONTROL METHOD THEREFOR

CROSS-REFERENCE TO RELATED APPLICATIONS

This application is a National Stage application under 35 U.S.C. § 371 of International Application No. PCT/KR2017/000822, filed on Jan. 24, 2017, which claims the benefit of Korean Application No. 10-2016-0010693, filed on Jan. 28, 2016. The disclosures of the prior applications are incorporated by reference in their entirety.

TECHNICAL FIELD

The present invention relates to a washing machine and a method of controlling the same.

BACKGROUND ART

In general, washing machines are apparatuses that perform a cleaning operation through washing, rinsing, and dehydrating processes so as to remove dirt from clothing or bedding (hereinafter, referred to as "laundry") using water, detergent, and mechanical operations.

Washing machines are largely classified into agitator-type, pulsator-type, and drum-type washing machines.

An agitator-type washing machine performs a washing operation by rotating a washing rod, protruding from the center of a tub, alternately in both directions. A pulsator-type washing machine performs a washing operation using friction between water and laundry by rotating a circular-plate-shaped pulsator, provided in the lower portion of a tub, alternately in both directions. A drum-type washing machine performs a washing operation by introducing water, detergent and laundry into a drum and rotating the drum.

The above washing machines commonly perform a process of washing laundry by supplying wash water and detergent to the laundry and applying mechanical force to the same, a process of rinsing the laundry through discharge and resupply of the wash water, and a process of dehydrating the laundry by discharging all of the wash water and removing moisture contained in the laundry.

At this time, laundry having low density and accordingly being thin and soft, such as bedding, towels or T-shirts, absorbs a relatively large amount of wash water supplied thereto, whereas laundry having high density and accordingly being thick and stiff, such as jeans or heavy clothing, absorbs a relatively small amount of wash water supplied thereto.

Thus, even though the amount of wash water that is supplied to laundry to wash the same is constant, the water level in the tub or the drum may vary.

In addition, relatively thin laundry may undesirably stretch or be damaged when relatively strong mechanical force is applied thereto, whereas relatively thick laundry may be insufficiently washed when relatively weak mechanical force is applied thereto.

Therefore, the washing machine needs to accurately analyze the properties of laundry and to supply wash water to an appropriate water level.

In addition, the washing machine needs to accurately analyze the properties of laundry and to appropriately select the rotation speed, rotation time period and agitation cycle of the drum.

A washing machine of the related art is configured to analyze the properties of laundry by supplying a predetermined amount of wash water, allowing the laundry to absorb the wash water for a predetermined time period, rotating the drum and the tub, and checking the change in the water level.

Alternatively, a washing machine of the related art is configured to analyze the properties of laundry by supplying a predetermined amount of wash water, allowing the laundry to absorb the wash water, rotating the drum and the tub, and comparing the current rpm of the motor that rotates the drum and the tub with a reference rpm of the motor.

Because laundry having very high moisture absorption capability, such as towels or bedding, absorbs most of the wash water, the washing machine of the related art that indirectly analyzes the properties of laundry based on information about a water level is not capable of accurately analyzing the properties of laundry using a water level sensor.

In other words, in the case of analyzing the properties of laundry based on information about a water level, the information may not be accurately obtained depending on the wash water absorption capability of laundry, and thus the washing machine of the related art is not capable of accurately analyzing the properties of laundry.

In addition, in the case of indirectly analyzing the properties of laundry using the rpm of the motor, noise occurs in accordance with variation in the voltage applied to the motor, and thus the washing machine of the related art is not capable of accurately analyzing the properties of laundry.

In addition, in the case of analyzing the properties of laundry based on information about driving of the motor and about a water level, the washing machine of the related art has an increased washing time period because an additional time period is required to analyze the properties of laundry, e.g. to supply a relatively large amount of wash water, to additionally drive the motor, and to measure the electric current of the motor.

DISCLOSURE

Technical Problem

An object of an embodiment of the present invention is to provide a method of controlling a washing machine that includes a camera for capturing an image of a drum and a tub and that directly analyzes the properties of laundry based on information about an image captured by the camera.

Another object of the embodiment of the present invention is to provide a method of controlling a washing machine that directly analyzes the properties of laundry by measuring the volume of the laundry using the camera.

A further object of the embodiment of the present invention is to provide a method of controlling a washing machine that directly analyzes the properties of laundry by accurately measuring the volume of the laundry using a single camera.

A further object of the embodiment of the present invention is to provide a method of controlling a washing machine that directly analyzes the properties of laundry by accurately measuring the volume of the laundry using a plurality of cameras.

A further object of the embodiment of the present invention is to provide a method of controlling a washing machine that has improved washing efficiency by setting or changing the amount of water to be supplied and the rotation speeds, rotation time periods and rotation cycles of the drum and the tub based on the analyzed properties of laundry so as to be suitable for the properties of laundry.

Technical Solution

In order to achieve the above objects, an embodiment of the present invention provides a method of controlling a washing machine, the method including detecting properties of laundry, the detecting the properties of the laundry including detecting the weight of the laundry, capturing an image of the interior of a drum, detecting the volume of the laundry in the drum using the captured image, and calculating the density of the laundry based on the detected volume and the detected weight.

In order to achieve the above objects, the embodiment of the present invention provides the method of controlling a washing machine, the method further including comparing the calculated density with a predetermined reference value, and changing at least one of a water level of wash water to be supplied to the drum, a rotation speed of the drum, a rotation time period of the drum, or a rotation change cycle of the drum depending on whether the calculated density is higher or lower.

In order to achieve the above objects, the embodiment of the present invention provides the method of controlling a washing machine, the method further including wetting the laundry, washing the laundry, rinsing the laundry, and dehydrating the rinsed laundry, wherein the detecting the properties of the laundry is performed before at least one of the wetting, the washing, the rinsing or the dehydrating so as to change at least one of the water level of wash water to be supplied to the drum, the rotation speed of the drum, the rotation time period of the drum, or the rotation change cycle of the drum in the at least one of the wetting, the washing, the rinsing or the dehydrating.

In order to achieve the above objects, the embodiment of the present invention provides the method of controlling a washing machine, wherein if the density calculated in the detecting the properties of the laundry is smaller than the reference value, at least one of the rotation speed of the drum, the rotation time period of the drum or the rotation change cycle of the drum is set to be less than a rotation speed of the drum, a rotation time period of the drum or a rotation change cycle of the drum corresponding to the reference value, and if the density calculated in the detecting the properties of the laundry is larger than the reference value, at least one of the rotation speed of the drum, the rotation time period of the drum or the rotation change cycle of the drum is set to be greater than the rotation speed of the drum, the rotation time period of the drum or the rotation change cycle of the drum corresponding to the reference value.

In order to achieve the above objects, the embodiment of the present invention provides the method of controlling a washing machine, wherein if the density calculated in the detecting the properties of the laundry is smaller than the reference value, the water level of wash water to be supplied to the drum is set to be higher than a water level of wash water to be supplied to the drum corresponding to the reference value, and if the density calculated in the detecting the properties of the laundry is larger than the reference value, the water level of wash water to be supplied to the drum is set to be lower than the water level of wash water to be supplied to the drum corresponding to the reference value.

In order to achieve the above objects, the embodiment of the present invention provides the method of controlling a washing machine, wherein the capturing includes capturing an image of the interior of the drum using a single camera.

In order to achieve the above objects, the embodiment of the present invention provides the method of controlling a washing machine, wherein the drum is provided in an inner circumferential surface thereof with a plurality of through-holes through which wash water flows into or out of the drum, and the detecting the volume of the laundry is performed by measuring the number of exposed ones of the through-holes formed in the inner circumferential surface of the drum from the image captured in the capturing.

In order to achieve the above objects, the embodiment of the present invention provides the method of controlling a washing machine, wherein the detecting the volume of the laundry is performed by extracting contours of the laundry from the image captured in the capturing.

In order to achieve the above objects, the embodiment of the present invention provides the method of controlling a washing machine, wherein the capturing includes capturing a first image using the camera, and capturing a second image using the camera after rotating the drum at a predetermined angle, and the detecting the volume of the laundry is performed by generating a stereoscopic image through synthesis of the first image and the second image.

In order to achieve the above objects, the embodiment of the present invention provides the method of controlling a washing machine, wherein the detecting the volume of the laundry is performed by analyzing light and shadow portions of the laundry appearing in the image captured in the capturing.

In order to achieve the above objects, the embodiment of the present invention provides the method of controlling a washing machine, wherein the capturing includes capturing images of the interior of the drum using a plurality of cameras provided so as to be spaced apart from each other, and the detecting the volume of the laundry is performed by processing the images captured by the plurality of cameras.

In order to achieve the above objects, the embodiment of the present invention provides the method of controlling a washing machine, wherein the capturing includes radiating light to the interior of the drum using an illuminating device, and capturing an image of the interior of the drum.

In order to achieve the above objects, the embodiment of the present invention provides the method of controlling a washing machine, wherein the density calculated in the detecting the properties of the laundry is compared with a predetermined reference value, and the method further includes notifying a user of a change of at least one of the water level of wash water to be supplied to the drum, the rotation speed of the drum, the rotation time period of the drum, or the rotation change cycle of the drum depending on whether the calculated density is higher or lower.

In order to achieve the above objects, the embodiment of the present invention provides the method of controlling a washing machine, the method further including waiting for a user to perform an input operation in the notifying, wherein if there is no input or a signal of approving of the change is input in the waiting, a washing process is performed according to the change of at least one of the water level of wash water to be supplied to the drum, the rotation speed of the drum, the rotation time period of the drum, or the rotation change cycle of the drum, and if a signal of disapproving of the change is input in the waiting, the washing process is performed according to at least one of the water level of wash water to be supplied to the drum, the rotation speed of the drum, the rotation time period of the drum, or the rotation change cycle of the drum that corresponds to the reference value.

In order to achieve the above objects, the embodiment of the present invention provides the method of controlling a washing machine, wherein the detecting the weight of the laundry includes calculating the weight by measuring an electric current that is applied to a motor when rotating the drum at a predetermined angle.

In order to achieve the above objects, an embodiment of the present invention provides a washing machine including a cabinet, a tub installed in the cabinet to contain wash water therein, the tub having an entrance formed in a front side thereof, a drum rotatably installed in the tub to contain laundry therein, the drum having through-holes formed in a cylindrical-shaped side surface thereof, a motor for rotating the drum, a camera installed in the entrance to capture an image of the interior of the drum, and a controller for calculating the density of the laundry contained in the drum by measuring the volume and the weight of the laundry based on the image captured by the camera and the load of the motor.

In order to achieve the above objects, the embodiment of the present invention provides the washing machine further including an illuminating device for radiating light to the interior of the drum.

In order to achieve the above objects, the embodiment of the present invention provides the washing machine, wherein the illuminating device is provided in at least one of the entrance of the tub or the inner circumferential surface of the drum.

Advantageous Effects

An embodiment of the present invention may directly analyze the properties of laundry based on information about an image captured by a camera, thereby increasing the accuracy of analysis of the properties of laundry.

The embodiment of the present invention may analyze the properties of laundry in a short period of time without increasing the total washing time period.

The embodiment of the present invention may analyze the properties of laundry and thus may provide a washing method suitable for the laundry.

DESCRIPTION OF DRAWINGS

FIGS. 1 and 2 are views illustrating a washing machine according to an embodiment of the present invention.

FIG. 3 is a view for explaining the configuration of a camera.

FIGS. 4 to 9 are views illustrating various embodiments of measuring the volume of laundry using a single camera.

FIG. 10 is a view illustrating an embodiment of measuring the volume of laundry using two cameras.

FIG. 11 is a view illustrating the configuration of a motor for measuring the weight of laundry.

FIG. 12 is a view illustrating a laundry-property-detecting step of a control method according to the embodiment of the present invention.

FIG. 13 is a view illustrating a washing process of the washing machine according to the embodiment of the present invention.

BEST MODE

Hereinafter, exemplary embodiments of the present invention will be described in detail with reference to the accompanying drawings. Meanwhile, the configuration of an apparatus or a control method thereof, which will be described below, is merely given to describe the embodiments of the present invention, and is not intended to limit the scope of the present invention. The same reference numerals used throughout the specification refer to the same constituent elements.

As shown in FIGS. 1 and 2, a washing machine 1 according to an embodiment of the present invention may include a cabinet 10 defining the external appearance of the washing machine, a tub 20 disposed in the cabinet to contain wash water and having therein an opening, a door 30 for opening or closing the tub 20, an extending unit 40 disposed at the front side of the tub 20 and defining a front entrance through which laundry is put into or taken out of the tub 20, a front gasket 45 provided at the extending unit to seal the tub 20 and the door 30, a drum 50 rotatably installed in the tub 20, and a motor 60 for driving the drum 50.

The cabinet 10 may be provided with a display unit 11, which displays washing information, such as the amount of water to be supplied, the rotation speed of the drum, the rotation time period of the drum, the rotation change cycle of the drum, and the like, to a user.

In addition, the cabinet 10 may be provided with an input unit 12, which includes buttons through which a user approves or disapproves of the washing information displayed on the display unit 11.

The tub 20 may contain wash water, and the wash water may be introduced into the drum 50 through a plurality of through-holes 51 formed in the inner circumferential surface of the drum 50.

The drum 50 may be provided at the inner wall thereof with a plurality of lifts 52 to lift and then drop laundry.

The washing machine 1 may include a camera 100 to capture an image of the interior of the drum 50.

The camera 100 may be disposed at the upper end of the tub 20 in order to capture an image of the entire area within the drum 50 or to capture an image of the area below the rotation center of the drum 50 within the drum 50.

In detail, the camera 100 may be provided at the upper portion of the extending unit 40, or may be secured to the front gasket 45.

That is, since the extending unit 40 serves as the entrance of the tub, it may be said that the camera 100 is disposed at the entrance of the tub.

The camera 100 may be provided separately from the drum 50, and thus, even when the drum 50 rotates, the camera 100 may remain stationary and may continuously capture images of the interior of the drum 50.

Accordingly, the camera 100 may capture an image of the laundry contained in the drum 50.

The camera 100 may capture an image of the laundry once or more, or may capture a video of the laundry.

The camera 100 may be a monocular camera including a single image-capturing system.

Alternatively, the camera 100 may be provided in a plural number, or may be a binocular camera including two image-capturing systems.

Alternatively, the camera 100 may be a stereoscopic camera, which directly generates a stereoscopic image.

Alternatively, the camera 100 may generate a stereoscopic image from a 2-dimensional image captured by a monocular camera. For example, a method of generating a stereoscopic image from a 2-dimensional image captured by a monocular camera may be basically realized by synthesizing a monocular image captured by the monocular camera 100 and another monocular image corresponding thereto.

In other words, a stereoscopic image may be generated by capturing two images from different angles and synthesizing the same.

The washing machine 1 has been described with reference to a drum-type washing machine. However, the washing machine 1 may be a pulsator-type or agitator-type washing machine, as long as the camera 100 can capture an image of laundry.

The washing machine 1 may further include a controller, which may control the supply and discharge of water, a washing process, a rinsing process and a dehydrating process of the washing machine 1, as well as the operation of the camera 100 and the motor 60.

In addition, the washing machine 1 may further include an illuminating device 70, which may enable the camera 100 to clearly capture an image of the laundry contained in the drum 50.

The illuminating device 70 may be provided integrally with the camera 100, or may also be provided on the inner circumferential surface of the drum 50.

The illuminating device 70 may be any type of device, such as a flash, an LED, an incandescent lamp, or the like, as long as it can radiate light toward the interior of the drum 50.

With reference to FIG. 3, an embodiment of the present invention in which the camera 100 is a monocular camera including a single image-capturing system will now be described.

At this time, the camera 100 may include a lens 110 for collecting light from an object being imaged, an image sensor 120 for detecting the formed image that has passed through the lens 110, and a controller 200 for generating a stereoscopic image by synthesizing the images detected by the image sensor 120.

As illustrated, one lens 110 may be provided. However, the case in which a plurality of lenses is provided along the same line is not excluded.

The camera 100 may include a compensation device 140 for compensating for vibration generated in home appliances.

The compensation device 140 is a device that makes it possible to form the same image at a constant position in the image sensor 120 by moving the position of the lens 110 or the image sensor 120 even when the camera 100 or the washing machine 1 vibrates.

The compensation device 140 may be an optical image stabilizer (OIS). However, the compensation device 140 may be any type of compensation device, as long as it can realize the formation of a clear image on the image sensor by compensating for vibration.

When the magnitude and direction of the vibration are detected by a gyroscope 130, the controller 200 calculates the direction in which the lens 110 or the image sensor 120 needs to be moved in order to compensate for the detected magnitude and direction of the vibration.

Subsequently, the compensation device 140 may move the position of the lens 110 or the image sensor 120 in accordance with the moving direction calculated by the controller 200.

An image-synthesizing unit 150 may generate an image of an object by synthesizing a plurality of images detected by the image sensor 120. The image-synthesizing unit 150 may not be provided separately, but may be implemented as calculation processing by the controller 200. However, in the case in which a large amount of calculations is required, the image-synthesizing unit 150 may be provided separately from the controller 200.

The components of the monocular camera 100 described above are illustrative only, and are not intended to exclude the application of other types of monocular cameras or to preclude the addition of other components.

The washing machine 1 of the present invention may directly measure the volume of laundry by capturing an image of the interior of the drum 50 using the camera 100.

The washing machine 1 may analyze the properties of laundry by measuring the volume of the laundry using the camera 100, which will be described later.

The washing machine 1 may adopt a washing method and washing conditions suitable for the laundry based on the analyzed properties of the laundry.

With reference to FIGS. 4 to 9, a method of measuring the volume of the laundry contained in the drum using the camera 100, which is configured as a monocular camera, will be described.

The laundry may be contained in the drum 50 of the washing machine 1.

The laundry may be wet with wash water supplied thereto. The amount of wash water supplied to the drum 50 may be larger than the amount of wash water used to wet the laundry, and thus the laundry and the wash water may be contained together in the drum 50.

Referring to FIG. 4, the drum 50 may rotate the laundry, as shown in FIGS. 4a and 4b, and the camera 100 may continuously capture images of the laundry from the state of FIG. 4a to the state of FIG. 4b, and may generate a stereoscopic image through post-processing, thereby acquiring the stereoscopic shape and the volume of the laundry.

If the volume of the laundry is calculated through stereoscopic image processing, even when the overall shape of the laundry is changed by the rotation of the drum, it may be possible to track the change in shape and consequently to accurately measure the overall volume of the laundry.

In addition, if the volume of the laundry is calculated through stereoscopic image processing, even when the laundry absorbs the wash water, it may be possible to analyze the process and consequently to accurately analyze the properties of the laundry.

However, in order to perform image processing, the controller 200 requires continuous resources, and must have high performance in order to perform a large amount of calculation processing.

In addition, because the controller must continuously perform image processing, the controller may be overloaded, and if the camera 100 or the controller 200 fails to recognize or sense the movement of the laundry, measurement of the shape and the volume of the laundry may not be accurately achieved.

FIG. 5 is a view illustrating a method of calculating the volume of the laundry through simple image capturing and image processing using the camera 100. That is, in the embodiment shown in FIG. 5, a microcomputer used in the related art may be utilized as the controller 200. Particularly, FIG. 5 is a view illustrating a method of calculating the volume of the laundry using the camera 100, which is a monocular camera, the method including capturing images of the laundry twice and performing processing of the images captured twice.

Referring to FIGS. 4 and 5, when the laundry is located in the drum 50, as shown in FIG. 4a, the camera 100 may capture an image of the laundry once and may acquire the image (FIG. 5a).

Subsequently, as shown in FIG. 4b, the controller 200 may drive the motor 60 so that the drum 50 is rotated at a certain angle.

Subsequently, the camera 100 may capture an image of the laundry once again, and may acquire another image (FIG. 5b).

As such, the camera 100 captures images of the laundry twice while rotating the laundry, thereby exhibiting the same effect as when capturing images of the laundry from different angles. Accordingly, the controller 200 may analyze the stereoscopic shape of the laundry by synthesizing the images.

That is, the controller 200 may acquire a stereoscopic image through processing of the image (FIG. 5a) of the laundry that has been captured once and the image (FIG. 5b) of the laundry that has been captured once again after rotating the laundry and thus changing the angle.

This is the same as the principle of vision by the two eyes of a person, which recognizes an object and calculates a distance to the object and the volume of the object.

That is, although the camera 100 is a monocular camera including a single image-capturing system, it synthesizes the images, captured twice while the position of an object is changed, and thus exhibits the same effect as when capturing an image using a binocular camera including two image-capturing systems.

Also, although the camera 100 is a single monocular camera, it exhibits the same effect as when capturing images using a plurality of cameras spaced apart from each other.

In other words, the image of FIG. 5b may be regarded as an image captured by a left lens or a left camera, and the image of FIG. 5a may be regarded as an image captured by a right lens or a right camera.

As described above, the controller 200 may easily analyze the shape and the volume of the laundry using the monocular camera.

At this time, the rotation angle of the drum 50 may be less than 360 degrees. Specifically, the rotation angle may be less than 90 degrees in order to prevent changes in the shape of the laundry.

If the laundry is rotated 90 degrees or more, the laundry may fall from the inner circumferential surface of the drum 50 due to gravity, or may be changed in shape. Thus, the images of the laundry captured twice may not match, making it impossible to acquire an accurate stereoscopic image of the laundry.

As described above, the controller 200 may analyze the stereoscopic shape of the laundry through the aforementioned image-capturing method. However, the images merely contribute to the formation of the stereoscopic shape of the laundry, but do not provide concrete dimensions of the laundry. Thus, the controller 200 needs to accurately calculate the volume of the laundry based on the stereoscopic shape of the laundry.

To this end, the controller 200 may measure the distance between the lens 110 of the camera 100 and the laundry located at each position, and may generate a reference value, based on which the volume of the laundry can be accurately measured.

In addition, the controller 200 may accurately measure the size and the volume of the laundry using the distance between the camera 100 and the laundry located at each position, the rotation angle of the drum 50 and the radius of the drum 50.

Hereinafter, a concrete embodiment related to the aforementioned volume measurement will be described.

The lens 110 of the camera 100 may have a certain magnification and focal length, and the information about the lens 110 may have been stored previously in the controller 200.

The camera 100 may capture an image of the laundry, and the captured image may be focused on the image sensor 120.

At this time, the controller 200 may measure the length and the area of the image focused on the image sensor 120, and consequently may calculate the actual length and area of the laundry through magnification by the lens.

Accordingly, it may be possible to accurately calculate the volume of the laundry.

According to the above-described method, it may be possible to calculate the actual volume of the laundry merely by capturing images of the laundry twice using a single camera and synthesizing the images captured twice without the necessity to continuously capture images of the laundry.

Therefore, a monocular camera used in conventional home appliances can be applied to the washing machine 1, and thus an expensive stereoscopic camera is not required. Further, a microcomputer used in conventional home appliances can be applied to the washing machine, and thus a high-performance controller is not required. Accordingly, manufacturing costs may be reduced.

In addition, it is not necessary to continuously track the movement of the laundry, and thus there is no risk of failure to measure the volume of the laundry.

Hereinafter, other embodiments of measuring the volume of the laundry will be described.

The embodiment described below may also exhibit the same effect as the embodiment described above by utilizing the same camera 100 and controller 200 as those used in the above embodiment to measure the volume of the laundry.

With reference to FIG. 6, another embodiment of measuring the volume of the laundry using the stereoscopic shape will be described.

It is assumed that the laundry is located at a position A in the initial stage and is moved to a position B by rotation of the drum 50.

L1 represents an image focused on the image sensor 120 when the camera 100 captures an image of the laundry.

When the laundry is located at the position A, the camera 100 captures an image of the laundry once, and acquires a single image. At this time, the controller 200 may calculate a distance D1 between the lens 110 and the laundry through resolution processing of the image of the laundry focused on the image sensor 120.

That is, it may be possible to calculate the distance between the lens 110 and the laundry based on the focal length of the lens 110, the magnification of the lens 110, and the definition of the image of the object.

Subsequently, the drum 50 rotates the laundry at a certain angle $\theta$.

Subsequently, when the laundry is located at the position B, the camera 100 captures an image of the laundry once again, and acquires another image. At this time, the controller 200 may calculate a distance D2 between the lens 110 and the laundry in the same manner as described above.

As a result, the controller 200 may accurately calculate the area of the laundry located at each position using the stereoscopic shape of the laundry and the accurately measured distance, thereby calculating the volume of the laundry.

Hereinafter, a further embodiment of simply calculating the volume will be described.

The camera 100 captures images of the laundry when the laundry is located the position A and when the laundry is located at the position B.

At this time, the controller 200 may acquire a stereoscopic shape of the laundry by synthesizing the captured images.

At this time, a radius R of the drum and a distance D3 between the center of the drum 50 and the lens 110 of the camera may have been stored previously in a storage unit of the controller 200.

Subsequently, the rotation angle θ of the drum 50 may be calculated based on the electric current value of the motor 60.

Accordingly, the controller 200 may calculate an angle (θ/2) between the extension line of D3 and the laundry located at the position A.

Accordingly, the controller 200 may calculate R, D3 and π−θ/2, and thus may calculate D1 through the second cosine law. In the same manner, the controller may calculate D2.

That is, the lengths D1 and D2 may be accurately calculated from the stereoscopic shape, and thus the volume of the stereoscopic shape may be accurately measured through the calculation based thereon.

In addition, formulas for calculating the volume of a rectangular parallelepiped or a sphere, which is the most similar to the shape of the laundry, are stored in the controller 200 in advance, and the volume of the laundry may be accurately calculated through a proportional expression based on the foregoing lengths and the magnification.

Although the embodiment has been described on the assumption that the laundry is rotated symmetrically within the drum 50, this is merely illustrative. The laundry may be rotated at any angle, as long as the camera 100 can capture images of the laundry twice while the position of the laundry is changed.

With reference to FIG. 7, a further embodiment of measuring the shape and the volume of the laundry will be described.

The controller 200 may have previously stored therein information about an image of the interior of the drum 50 that the camera 100 captured when the drum 50 was empty (FIG. 7a).

In addition, the controller 200 may have measured the number of through-holes 51 formed in the drum 50 and may have previously stored the same therein.

Subsequently, when laundry is introduced, the camera 100 may capture an image of the interior of the drum 50 once.

FIG. 7b is a view illustrating the state in which a relatively small volume of laundry is contained in the drum 50, and FIG. 7c is a view illustrating the state in which a relatively large volume of laundry is contained in the drum 50.

At this time, the controller 200 may measure the volume of the laundry by measuring the number of through-holes 51 that are exposed to the interior of the drum 50 in which the laundry is contained.

That is, the controller 200 may measure the exposed portion of the rotation center of the drum 50 and the exposed portion of the inner circumferential surface of the drum 50 using the number of through-holes 51, and may measure the area and the height of the laundry, thereby calculating the volume of the laundry.

With reference to FIG. 8, a further embodiment of measuring the volume of the laundry will be described.

When the laundry is contained in the drum 50, the controller 200 may extract the contours of the laundry using the camera 100.

FIG. 8a is a view illustrating the contours of the laundry extracted by the controller 200 when the laundry is contained in the drum 50, like the state of FIG. 7b, and FIG. 8b is a view illustrating the contours of the laundry extracted by the controller 200 when the laundry is contained in the drum 50, like the state of FIG. 7c.

The controller 200 may have previously stored therein a database pertaining to the contours that the laundry has when a minimum volume of laundry is contained in the drum 50 and when a maximum volume of laundry is contained in the drum 50.

The controller 200 may measure the volume of the laundry by comparing the current contours of the laundry, acquired by the camera 100 capturing an image of the interior of the drum 50, with the foregoing database.

In addition, the controller 200 may compare the contours of the laundry with the inner circumferential surface of the drum 50, and consequently may measure the volume of the laundry through the comparison with the volume of the drum 50.

FIG. 9 is a view illustrating a final embodiment of measuring the volume of the laundry.

The controller 200 may perform control such that the illuminating device 70 radiates light toward the laundry and such that the camera 100 captures an image of the laundry.

At this time, due to the light radiated from the illuminating device 70, the image of the laundry has light and shadow portions such that the convex portion of the laundry appears bright and the concave portion of the laundry appears dark.

At this time, the controller 200 may analyze the shape of the laundry and may measure the volume of the laundry by measuring a ratio of the light portion to the shadow portion in the captured image.

FIG. 10 is a view illustrating the configuration in which the camera 100 is a binocular camera including two lenses 110 or in which the camera 100 is provided in a plural number in order to measure the volume of the laundry.

The camera 100 may include a first camera 101 and a second camera 102 spaced apart from the second camera 101 by a predetermined distance.

The first camera 101 and the second camera 102 may be arranged symmetrically to each other about the rotation center of the drum 50.

For example, the first camera 101 may capture an image of the laundry on the left side, and the second camera 102 may capture an image of the laundry on the right side. These captured images may be synthesized so as to enable the analysis of the shape and the volume of the laundry.

At this time, it may be possible to measure the volume of the laundry by capturing images of the laundry using the first camera 101 and the second camera 102 at the same time without rotating the drum 50.

Since the first camera 101 and the second camera 102 capture images of the laundry at the same time, it may be possible to acquire the stereoscopic shape of the laundry in the state in which the shape of the laundry is fixed, thereby enabling more accurate measurement of the volume of the laundry.

The properties of the laundry may be determined based on the density of the laundry. If the density of the laundry is high, the laundry may be regarded as being thick and stiff and thus absorbing a relatively small amount of wash water, and if the density of the laundry is low, the laundry may be regarded as being thin and soft and thus absorbing a relatively large amount of wash water.

Therefore, if the density is high, the laundry may be determined to be thick and stiff, and if the density is low, the laundry may be determined to be thin and soft.

Since the volume of the laundry is acquired through the camera 101, the properties of the laundry may be determined by measuring the weight of the laundry. This is because density is calculated as weight divided by volume.

FIG. 11 is a view illustrating the configuration of measuring the weight of the laundry through the load of the motor of the drum 50.

The washing machine 1 according to the embodiment of the present invention may include a voltage converter 300, which receives alternating-current power transmitted from the outside and converts the same into a direct-current voltage through rectification and smoothing, a switching unit 310, which generates and outputs a signal current for driving the motor 60 through a switching operation thereof, the motor 60, which performs operation such that it is rotated in response to the motor-driving signal current transmitted from the switching unit 310, and a sensor 320, which is installed to the motor 60 to sense the number of revolutions per minute and the rotation speed of the motor 60 or to detect the electric current of the motor 60.

The sensor 320 may be provided separately from the controller 200, and may transmit a signal to the controller 200.

Alternatively, in the case in which the controller 200 is configured to directly detect the electric current of the motor 60, the sensor 320 may be omitted, or may be provided integrally with the controller 200.

That is, the controller 200 may be configured to generate the motor-driving signal current and to sense the operation of the motor 60.

Therefore, in the state in which the laundry is contained in the drum 50, the controller 200 may stop the drum 50 through dynamic braking after rotating the drum 50 for a predetermined period of time, and may measure the electric current of the motor 60 required to stop the drum 50, thereby calculating the weight of the laundry.

Alternatively, the controller 200 may interrupt the supply of electric current to the motor 60 after rotating the drum 50 for a predetermined period of time, and may measure the electric current, which is generated when the drum 50 rotates due to inertia together with the laundry, using the sensor 320, thereby calculating the weight of the laundry.

The above-described method is only an exemplary embodiment of calculating the weight of the laundry, and is not intended to exclude the application of other technologies. Any laundry-weight-calculating method used in the art to which the present invention pertains may be applicable.

As a result, the controller 200 may analyze the properties of the laundry by measuring the weight and the volume of the laundry.

With reference to FIG. 12, a control method for analyzing the properties of the laundry will be described.

The washing machine 1 may perform a laundry-amount-detecting step in response to input by a user or a command from the controller 200.

A weight-detecting step (S1) of detecting the weight of the laundry, which is contained in the drum 50, is first performed.

In the weight-detecting step, as described above, the controller rotates the drum 50 at a constant speed for a predetermined period of time in the state in which laundry is contained in the drum 50, and senses the load of the motor 60 when stopping the drum 50 through reverse-phase braking or dynamic braking, thereby detecting the weight of the laundry.

At this time, the controller 200 may memorize the weight of the laundry for a predetermined period of time.

Subsequently, an image-capturing step (S2) of capturing an image of the interior of the drum 50 using the camera 100 and of acquiring the shape and the volume of the laundry is performed.

Subsequently, a volume-detecting step (S3) of calculating the volume of the laundry based on the information about the image captured in the image-capturing step is performed.

If the method described with reference to FIG. 4 is applied to the image-capturing step (S2) and the volume-detecting step, the camera 100 may capture images of the interior of the drum 50 a plural number of times while the drum 50 is rotated, and may acquire a stereoscopic image of the laundry. At this time, the controller 200 may detect the volume of the laundry by analyzing the stereoscopic image of the laundry.

Alternatively, if the method described with reference to FIGS. 5 and 6 is applied, the camera 100 may capture an image of the interior of the drum 50 once, and may capture another image of the interior of the drum 50 once again after rotating the drum 50 at a predetermined angle.

Subsequently, the controller 200 acquires a stereoscopic image of the laundry by processing the captured images. Subsequently, the controller may detect the overall volume of the laundry by analyzing the focus and the definition of the image formed on the lens 110 or by measuring the distance between the laundry and the camera 110 based on the radius of the drum 50 and the rotation angle of the drum.

Alternatively, if the method described with reference to FIG. 7 is applied, the camera 100 may capture and acquire an image of the drum 50 containing the laundry once, and the controller 200 may compare the number of through-holes formed in the drum 50, which has been previously stored in the controller, with the number of through-holes exposed to the interior of the drum 50, which is determined based on the acquired image, thereby detecting the volume of the laundry.

Alternatively, if the method described with reference to FIG. 8 is applied, the camera 100 may capture and acquire an image of the drum 50 containing the laundry once, and the controller 200 may extract the contours of the laundry from the image. Subsequently, the controller 200 may detect the volume of the laundry based on the picture of the interior of the drum 50, which has been previously stored in the controller, or may detect the volume of the laundry by comparing the extracted contours of the laundry with the database pertaining to the contours of various amounts of laundry, which has been previously stored in the controller.

Alternatively, if the method described with reference to FIG. 9 is applied, the illuminating device 70 may radiate light, the camera 100 may capture and acquire an image of the laundry, and the controller 200 may analyze the light and shadow portions from the image of the laundry, thereby detecting the volume of the laundry.

At this time, the illuminating device 70 may not only radiate light in the volume-detecting step illustrated in FIG. 9, but may also radiate light in the volume-detecting steps illustrated in FIGS. 5 to 8.

Because the interior of the drum 50 is shielded from the outside, the amount of light that is introduced into the drum 50 is very small. Thus, artificial light is required in order for the camera 100 to capture an image of the interior of the drum 50.

That is, the image-capturing step (S2), in which the camera 100 captures an image of the interior of the drum 50, may be defined such that the camera 100 captures an image of the interior of the drum while the illuminating device 70 radiates light to the interior of the drum.

When the volume-detecting step (S3) is completed, the controller 200 performs a density-calculating step (S4) of calculating the density of the laundry based on the weight of the laundry, which has been temporarily stored in the controller, and on the volume detected in the volume-detecting step (S3).

At this time, the controller may additionally perform an agitating step (S1-1) of agitating the drum 50 in order to evenly distribute the laundry within the drum 50 before the image-capturing step (S2).

When a predetermined amount of wash water is supplied to the drum 50, the agitating step (S1-1) may be performed so that the wash water is absorbed in the laundry, and consequently, the volume of the laundry can be more accurately measured in the image-capturing step (S2) and the volume-detecting step (S3), which are subsequently performed.

That is, although the volume-detecting step (S3) has been described above as detecting the volume of the laundry, it may be considered to be a step of detecting the total volume of the laundry and the wash water contained in the drum 50.

The washing machine 1 may determine washing information suitable for washing of the laundry based on the properties of the laundry acquired in the laundry-property-detecting step.

Particularly, the controller 200 may compare the density calculated in the laundry-property-detecting step with a predetermined reference value, and may change the water level of the wash water to be supplied to the drum 50, the rotation speed of the drum, the rotation time period of the drum, and the rotation change cycle of the drum depending on whether the calculated density is higher or lower.

The reference value may be a value related to the density or properties of, for example, T-shirts or dress shirts made of a cotton material. The reference value may have been previously stored in the controller 200.

That is, the controller 200 may compare the value related to the properties of the laundry acquired in the laundry-property-detecting step with the reference value, and may determine which one is larger.

If the value related to the properties of the laundry is smaller than the reference value, the water level of the wash water to be supplied may be set to be higher than the water level corresponding to the reference value.

If the value related to the properties of the laundry is small, this means that the density of the laundry is low, i.e. that the volume is large compared to the weight.

Therefore, if the value related to the properties of the laundry is smaller than the reference value, the laundry may absorb a larger amount of wash water than clothing corresponding to the reference value, and thus a much greater amount of wash water needs to be supplied for effective washing.

That is, in order to make the wash water reach the water level intended by the washing machine 1, there is a need to supply a greater amount of wash water than that corresponding to the reference value.

In addition, if the value related to the properties of the laundry is smaller than the reference value, the rotation speed of the drum, the rotation time period of the drum and the rotation change cycle of the drum may be set to be less than the rotation speed of the drum, the rotation time period of the drum and the rotation change cycle of the drum corresponding to the reference value.

This is because, if the value related to the properties of the laundry is smaller than the reference value, the laundry can be washed with a relatively weak mechanical force.

In addition, this is because, if the value related to the properties of the laundry is smaller than the reference value, the laundry may undesirably stretch, or may be damaged when mechanical force equal to that corresponding to the reference value is applied thereto.

That is, if the value related to the properties of the laundry is smaller than the reference value, a mechanical force to be applied to the laundry may be lowered by reducing the rotation speed of the drum below that corresponding to the reference value, reducing the total rotation time period of the drum below that corresponding to the reference value, and reducing the rotation change cycle of the drum (i.e. the cycle at which the rotation of the drum is changed between the clockwise direction and the counterclockwise direction) below that corresponding to the reference value.

If the value related to the properties of the laundry is larger than the reference value, the washing information may be changed in the manner opposite that when the value related to the properties of the laundry is smaller than the reference value.

Referring to FIG. 13, like the washing machine of the related art, the washing machine 1 may perform a laundry-wetting step (G1) of wetting the laundry contained in the drum 50 by supplying a predetermined amount of wash water to the laundry, a washing step (G2) of washing the laundry by additionally supplying detergent and wash water to the laundry sufficiently soaked in the wash water and by rotating the drum 50, a rinsing step (G3) of removing dirt and detergent from the laundry by repeating the processes of discharging the wash water from the completely washed laundry, resupplying wash water, rotating the drum and discharging the wash water, and a dehydrating step (G4) of removing moisture from the laundry by supplying wash water to the completely rinsed laundry and by rotating the drum at a high speed in a constant direction.

The laundry-property-detecting step may be performed at least once before the laundry-wetting step (G1), before the washing step (G2), before the rinsing step (G3), and before the dehydrating step (G4).

That is, based on the properties of the laundry analyzed in the laundry-property-detecting step, the water level of the wash water to be supplied may be changed in the laundry-wetting step (G1), and the amount of wash water to be supplied and the rotation speed, rotation time period and rotation change cycle of the drum may be changed in the washing step (G2), the rinsing step (G3) and the dehydrating step (G4) so as to be suitable for the laundry.

In other words, the laundry-property-detecting step may be performed before each of the laundry-wetting step (G1), the washing step (G2), the rinsing step (G3), and the dehydrating step (G4), so that a washing process determined to be suitable for each step may be performed.

Alternatively, the laundry-property-detecting step may be performed once before the laundry-wetting step (G1), the washing step (G2), the rinsing step (G3), or the dehydrating step (G4), so that any one of these steps may be performed according to the washing information determined to be suitable for washing of the laundry.

At this time, for example, when the value related to the properties of the laundry is low, unlike the washing step (G2) and the rinsing step (G3), the dehydrating step (G4) may be performed such that the rotation time period of the drum exceeds the rotation time period of the drum corresponding to the reference value.

The reason for this is that, if the value related to the properties of the laundry is low, the laundry may be determined to contain a larger amount of moisture therein, and thus a longer time may be required to remove moisture from the laundry.

Referring to FIG. 12, when the washing information (the amount of wash water to be supplied, the rotation time period, rotation change cycle and rotation speed of the drum, etc.) is changed so as to be suitable for washing of the laundry based on the value related to the properties of the laundry measured in the laundry-property-detecting step, a user may not approve of the changed washing information.

That is, even when the value related to the properties of the laundry is low, in order to complete the washing process and remove dirt in a short time, a user may want to wash the laundry with the same washing process as that when the value related to the properties of the laundry is equal to the reference value.

In order to satisfy this requirement of the user, when the washing information is changed so as to be suitable for the value related to the properties of the laundry measured in the laundry-property-detecting step, a notification step (S5) of displaying the change to the user may be additionally performed.

In the notification step (S5), the washing information may be displayed to the user through the display unit 11 provided at the cabinet of the washing machine.

The washing machine 1 may further include an input-waiting step (S6) in which, when the washing information is displayed in the notification step (S5), a user inputs a command of approval or disapproval of the washing information.

Subsequently, when the user agrees to the washing information displayed in the notification step, the user may press an approval button through the input unit 12, so that the washing process is performed according to the washing information. Accordingly, the washing of the laundry may be performed based on the changed washing information.

However, even when the washing information has been displayed in the notification step, the user may not express his/her intention in the input-waiting step (S6) because, for example, the user is distant from the washing machine 1. In this case, it may be inefficient for the washing machine 1 to wait for the user's intention for a long time.

That is, even when input by the user does not occur, if the washing process is performed according to the changed washing information, it may be more effective for washing and protection of the laundry, and thus, in this case, the washing machine 1 may determine that the washing information is approved and may perform the washing process according to the changed washing information.

That is, the washing machine 1 may wait for user input for a predetermined time period in the input-waiting step (S6), and if there is no input, the washing machine 1 may perform the washing process according to the changed washing information.

On the other hand, in the input-waiting step (S6), when the user does not agree to the displayed washing information, the user may press a disapproval button through the input unit 12, so that the washing machine 1 may perform the washing process according to the washing information corresponding to the properties of laundry of which the value is equal to the reference value.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of controlling a washing machine, the method comprising:
   detecting properties of laundry in a drum of the washing machine,
   wherein detecting the properties of the laundry comprises:
      detecting a weight of the laundry,
      capturing an image of an interior of the drum using a single camera,
      detecting a volume of the laundry in the drum using the captured image, and
      calculating a density of the laundry based on the detected volume and the detected weight, and
   wherein the method further comprises:
      comparing the calculated density with a predetermined reference value,
      notifying a user of a change of at least one of a water level of wash water to be supplied to the drum, a rotation speed of the drum, a rotation time period of the drum, or a rotation change cycle of the drum based on whether the calculated density is higher or lower than the predetermined reference value,
      waiting for a user to perform an input operation in response to a notification of the change,
      based on receiving no input or a signal approving of the change while waiting for the user to perform an input operation, performing a washing process according to the change of at least one of the water level of wash water to be supplied to the drum, the rotation speed of the drum, the rotation time period of the drum, or the rotation change cycle of the drum, and
      based on receiving a signal disapproving of the change while waiting for the user to perform an input operation, performing a washing process according to at least one of a water level of wash water to be supplied to the drum, a rotation speed of the drum, a rotation time period of the drum, or a rotation change cycle of the drum that corresponds to the predetermined reference value.

2. The method according to claim 1, further comprising:
   changing at least one of the water level of wash water to be supplied to the drum, the rotation speed of the drum, the rotation time period of the drum, or the rotation change cycle of the drum based on whether the calculated density is higher or lower than the predetermined reference value.

3. The method according to claim 2, further comprising:
   wetting the laundry;
   washing the laundry;
   rinsing the laundry; and
   dehydrating the rinsed laundry,
   wherein detecting the properties of the laundry is performed before at least one of wetting the laundry, washing the laundry, rinsing the laundry, or dehydrating the laundry, and
   wherein at least one of the water level of wash water to be supplied to the drum, the rotation speed of the drum, the rotation time period of the drum, or the rotation change cycle of the drum is changed based on the detected properties of the laundry in the at least one of wetting the laundry, washing the laundry, rinsing the laundry, or dehydrating the laundry.

4. The method according to claim 2, further comprising:
   based on the calculated density being less than the predetermined reference value, setting at least one of the rotation speed of the drum, the rotation time period of the drum, or the rotation change cycle of the drum to be less than the rotation speed of the drum, the rotation time period of the drum, or the rotation change cycle of the drum corresponding to the predetermined reference value; and based on the calculated density being greater than the predetermined reference value, setting at least one of the rotation speed of the drum, the rotation time period of the drum or the rotation change cycle of the drum to be greater than the rotation speed of the drum, the rotation time period of the drum or the rotation change cycle of the drum corresponding to the predetermined reference value.

5. The method according to claim 4, further comprising:
based on the calculated density being less than the predetermined reference value, setting the water level of wash water to be supplied to the drum to be higher than the water level of wash water to be supplied to the drum corresponding to the predetermined reference value; and based on the calculated density being greater than the predetermined reference value, setting the water level of wash water to be supplied to the drum to be lower than the water level of wash water to be supplied to the drum corresponding to the predetermined reference value.

6. The method according to claim 1, wherein the drum has an inner circumferential surface that defines a plurality of through-holes configured to communicate wash water into or out of the drum, and wherein detecting the volume of the laundry is performed by measuring a number of exposed through-holes among the plurality of through-holes of the drum from the image.

7. The method according to claim 6, wherein capturing the image of the interior of the drum further comprises:
radiating light to the interior of the drum using an illuminating device; and
capturing the image while radiating the light to the interior of the drum.

8. The method according to claim 1, wherein detecting the volume of the laundry is performed by extracting contours of the laundry from the image.

9. The method according to claim 1, wherein detecting the volume of the laundry is performed by analyzing light and shadow portions of the laundry appearing in the image.

10. The method according to claim 1, wherein capturing the image of the interior of the drum further comprises capturing images of the interior of the drum using a plurality of cameras spaced apart from each other, and wherein detecting the volume of the laundry is performed by processing the images captured by the plurality of cameras.

11. The method according to claim 1, wherein detecting the weight of the laundry comprises calculating the weight by measuring an electric current that is applied to a motor while rotating the drum at a predetermined angle.

12. The method according to claim 1, wherein capturing the image of the interior of the drum further comprises:
radiating light to the interior of the drum using an illuminating device; and
capturing the image of the interior of the drum while radiating light to the interior of the drum.

13. The method according to claim 12, wherein detecting the volume of the laundry in the drum comprises:
determining, from the image, a light portion and a shadow portion of the laundry that are defined by radiating the light to the interior of the drum; and
detecting the volume of the laundry in the drum based on a ratio of the light portion with respect to the shadow portion.

14. The method according to claim 1, wherein capturing the image of the interior of the drum comprises:
capturing a first image using the single camera;
rotating the drum by less than one revolution from a first position at which the first image is taken; and
capturing a second image using the single camera after rotating the drum by less than one revolution, and
wherein detecting the volume of the laundry comprises generating a stereoscopic image based on the first image and the second image.

15. The method according to claim 14, wherein rotating the drum by less than one revolution comprises rotating the drum by less than 90 degrees from the first position at which the first image is taken.

16. The method according to claim 14, wherein rotating the drum by less than one revolution is performed based on maintaining an arrangement or shape of the laundry from the first position of the drum to a second position of the drum at which the second image is taken.

17. The method according to claim 1, wherein the method comprises notifying the user of the change of the water level of wash water to be supplied to the drum based on whether the calculated density is higher or lower than the predetermined reference value.

18. The method according to claim 1, wherein the method comprises notifying the user of the change of the rotation speed of the drum based on whether the calculated density is higher or lower than the predetermined reference value.

* * * * *